US010109309B1

(12) United States Patent
Jubert et al.

(10) Patent No.: US 10,109,309 B1
(45) Date of Patent: Oct. 23, 2018

(54) HEAT-ASSISTED MAGNETIC RECORDING (HAMR) MEDIUM WITH HEAT-SINK LAYER HAVING ANISOTROPIC THERMAL CONDUCTIVITY

(71) Applicant: Western Digital Technologies, Inc., San Jose, CA (US)

(72) Inventors: Pierre-Olivier Jubert, San Jose, CA (US); Kumar Srinivasan, Redwood City, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/694,276

(22) Filed: Sep. 1, 2017

(51) Int. Cl.
*G11B 5/73* (2006.01)
*G11B 5/708* (2006.01)
*G11B 5/706* (2006.01)
*G11B 13/08* (2006.01)
*G11B 5/49* (2006.01)
*G11B 5/738* (2006.01)
*H01F 10/10* (2006.01)
*H01F 10/12* (2006.01)
*G11B 5/00* (2006.01)

(52) U.S. Cl.
CPC ............ *G11B 5/708* (2013.01); *G11B 5/49* (2013.01); *G11B 5/70621* (2013.01); *G11B 5/732* (2013.01); *G11B 5/738* (2013.01); *G11B 5/7325* (2013.01); *G11B 13/08* (2013.01); *H01F 10/10* (2013.01); *H01F 10/12* (2013.01); *G11B 2005/0021* (2013.01)

(58) Field of Classification Search
CPC ....... G11B 5/732; G11B 5/7325; G11B 5/738; H01F 10/10; H01F 10/12
USPC .......................................... 360/135; 428/829
See application file for complete search history.

(56) References Cited

U.S. PATENT DOCUMENTS 7,862,914 B2  1/2011  Kubota et al.
8,509,039 B1  8/2013  Huang et al.
(Continued)

OTHER PUBLICATIONS

Sichel et al., "Heat capacity and thermal conductivity of hexagonal pyrolytic boron nitridee", Physical Review B, vol. 13, No. 10, May 15, 1976.

(Continued)

*Primary Examiner* — Jefferson Evans
(74) *Attorney, Agent, or Firm* — Thomas R. Berthold

(57) ABSTRACT

A heat-assisted magnetic recording (HAMR) medium includes a perpendicular magnetic recording layer (typically a chemically-ordered FePt alloy), a seed/thermal barrier layer (typically MgO) below the recording layer, and a heat-sink layer with anisotropic thermal conductivity below the seed/thermal barrier layer. The in-plane thermal conductivity of the heat-sink layer is greater than its out-of-plane thermal conductivity. The heat-sink layer may be selected from hexagonal boron nitride (h-BN), hexagonal graphite, and the 6H polytype of hexagonal silicon carbide (6H-SiC). If the heat-sink layer is h-BN, the h-BN layer is formed on a seed layer and has its c-axis oriented out-of-plane (substantially orthogonal to the surface of the medium substrate).

22 Claims, 8 Drawing Sheets

(56) References Cited

U.S. PATENT DOCUMENTS

| | | | |
|---|---|---|---|
| 8,605,555 B1 | 12/2013 | Chernyshov et al. | |
| 8,765,273 B1 | 7/2014 | Kubota et al. | |
| 8,867,322 B1 | 10/2014 | Chernyshov et al. | |
| 8,941,950 B2 | 1/2015 | Yuan et al. | |
| 9,236,078 B2 | 1/2016 | Hu et al. | |
| 9,406,329 B1 | 8/2016 | Ho et al. | |
| 9,530,445 B1 | 12/2016 | Grobis et al. | |
| 9,754,618 B1* | 9/2017 | Srinivasan | G11B 5/66 |
| 2004/0240327 A1* | 12/2004 | Sendur | B82Y 10/00 369/13.35 |
| 2011/0043941 A1* | 2/2011 | Champion | B82Y 10/00 360/59 |
| 2013/0004796 A1* | 1/2013 | Peng | G11B 5/66 428/827 |
| 2014/0308542 A1* | 10/2014 | Zhang | G11B 5/7325 428/831.2 |
| 2015/0017482 A1* | 1/2015 | Lee | G11B 5/746 428/833.1 |
| 2015/0302878 A1* | 10/2015 | Beaujour | G11B 5/738 369/13.33 |
| 2016/0148632 A1* | 5/2016 | Hellwig | G11B 5/66 360/75 |
| 2018/0218752 A1* | 8/2018 | Lu | G11B 5/7325 |

OTHER PUBLICATIONS

Wang et al., "Superior thermal conductivity in suspended bilayer hexagonal boron nitride", Scientific Reports | 6:25334 | DOI: 10.1038/srep25334, www.nature.com/scientificreports.

Burgemeister, "Thermal conductivity and electrical properties of 6H silicon carbide", Journal of Applied Physics 50, 5790 (1979); doi: 10.1063/1.326720.

Cometto et al., "Control of Nanoplane Orientation in voBN for High Thermal Anisotropy in a Dielectric Thin Film: A New Solution for Thermal Hotspot Mitigation in Electronics", ACS Appl. Mater. Interfaces 2017, 9, 7456-7464.

Zhou et al., "High thermal conductivity of suspended few-layer hexagonal boron nitride sheets", Nano Research 2014, 7(8): 1232-1240.

Bao et al., "Two-dimensional hexagonal boron nitride as lateral heat spreader in electrically insulating packaging", J. Phys. D: Appl. Phys. 49 (2016) 265501.

Slack, "Anisotropic Thermal Conductivity of Pyrolytic Graphite", Physical Review, vol. 127, No. 3, Aug. 1, 1962.

Obraztsov et al., "Chemical vapor deposition of thin graphite films of nanometer thickness", Carbon 45 (2007) 2017-2021, (Available online at www.elsevier.com/locate/carbon).

* cited by examiner

HEAT-ASSISTED MAGNETIC RECORDING (HAMR) MEDIUM WITH HEAT-SINK LAYER HAVING ANISOTROPIC THERMAL CONDUCTIVITY

BACKGROUND

Field of the Invention

This invention relates generally to a perpendicular magnetic recording medium for use as a heat-assisted magnetic recording (HAMR) medium, and more particularly to a HAMR disk with an improved heat-sink layer.

Description of the Related Art

In conventional continuous granular magnetic recording media, the magnetic recording layer is a continuous layer of granular magnetic material over the entire surface of the disk. In magnetic recording disk drives the magnetic material (or media) for the recording layer on the disk is chosen to have sufficient coercivity such that the magnetized data regions that define the data "bits" are written precisely and retain their magnetization state until written over to new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magnetocrystalline anisotropy ($K_u$) are required. The thermal stability of a magnetic grain is to a large extent determined by $K_uV$, where V is the volume of the magnetic grain. Thus a recording layer with a high $K_u$ is important for thermal stability. However, increasing $K_u$ also increases the coercivity of the media, which can exceed the write field capability of the write head.

Since it is known that the coercivity of the magnetic material of the recording layer is temperature dependent, one proposed solution to the thermal stability problem is heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature ($T_c$). The recorded data is then read back at ambient temperature by a conventional magnetoresistive read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the gas-bearing surface (GBS) of the gas-bearing slider that also supports the read/write head and rides or "flies" above the disk surface.

One type of proposed high-$K_u$ HAMR media with perpendicular magnetic anisotropy is an alloy of FePt (or CoPt) chemically-ordered in the $L1_0$ phase. The chemically-ordered FePt alloy, in its bulk form, is known as a face-centered tetragonal (FCT) $L1_0$-ordered phase material (also called a material with CuAu-type of phase). The c-axis of the $L1_0$ phase is the easy axis of magnetization and is oriented perpendicular to the disk substrate. To obtain the required microstructure and magnetic properties the FePt alloy requires deposition at high temperature or subsequent high-temperature annealing to achieve the desired chemical ordering to the $L1_0$ phase.

In HAMR media, a seed layer, typically MgO, is located below the FePt recording layer to induce the desirable (001) texture to the FePt magnetic grains and influence their geometrical microstructure. The seed layer also acts as a thermal barrier layer so that heat from the NFT is not dissipated too rapidly from the FePt recording layer. A heat-sink layer is located below the seed/thermal barrier layer to move heat generated in the recording layer down vertically (i.e., in the out-of-plane direction of the recording layer) so there will be less heat spreading laterally in the recording layer.

SUMMARY

Heat assisted magnetic recording (HAMR) is based on locally heating the recording layer above its Curie temperature ($T_c$) during the write process. The temperature rise needs to be local and with a large gradient (i.e., a rapid drop in temperature below $T_c$) to enable high-density magnetic recording. A large along-the-track thermal gradient allows data to be written at high linear density. A large cross-track thermal gradient allows writing data on one track without altering the data already written on neighboring tracks, which enables the data tracks to be positioned close together.

To improve the thermal gradient a heat-sink layer is located below the seed/thermal barrier layer. The heat-sink layer moves the heat generated in the recording layer down toward the disk substrate so there will be less heat spreading laterally in the recording layer. The stronger the heat-sink, the larger the lateral thermal gradient in the recording layer and the higher the potential recording density of the HAMR media. The conventional heat-sink layer is typically a layer of a material that is a good thermal conductor, like Cu, Au, Ag, Ru, Cr, Mo or W or other suitable metals or metal alloys, all of which have isotropic thermal conductivity, meaning that the thermal conductivity in the plane of the layer is substantially the same as the thermal conductivity out-of-plane.

In embodiments of this invention it has been discovered that HAMR media with high thermal gradients can be achieved with heat-sink materials that have anisotropic thermal conductivity, meaning that the thermal conductivity in-plane is higher than the thermal conductivity out-of-plane. In one embodiment of a HAMR disk, the heat-sink layer is selected from hexagonal boron nitride (h-BN), hexagonal graphite, and the 6H polytype of hexagonal silicon carbide (6H-SiC).

In an embodiment where the heat-sink layer is h-BN, the h-BN is formed on a seed layer and has its c-axis oriented out-of-plane (substantially orthogonal to the surface of the disk substrate). For the h-BN anisotropic heat-sink layer, the in-plane thermal conductivity is preferably greater than 50 W/mK and the ratio of in-plane (substantially orthogonal to the c-axis) thermal conductivity to out-of-plane (substantially parallel to the c-axis) thermal conductivity is preferably greater than about 1.2.

For a fuller understanding of the nature and advantages of the present invention, reference should be made to the following detailed description taken together with the accompanying figures.

DETAILED DESCRIPTION

Figure 1:
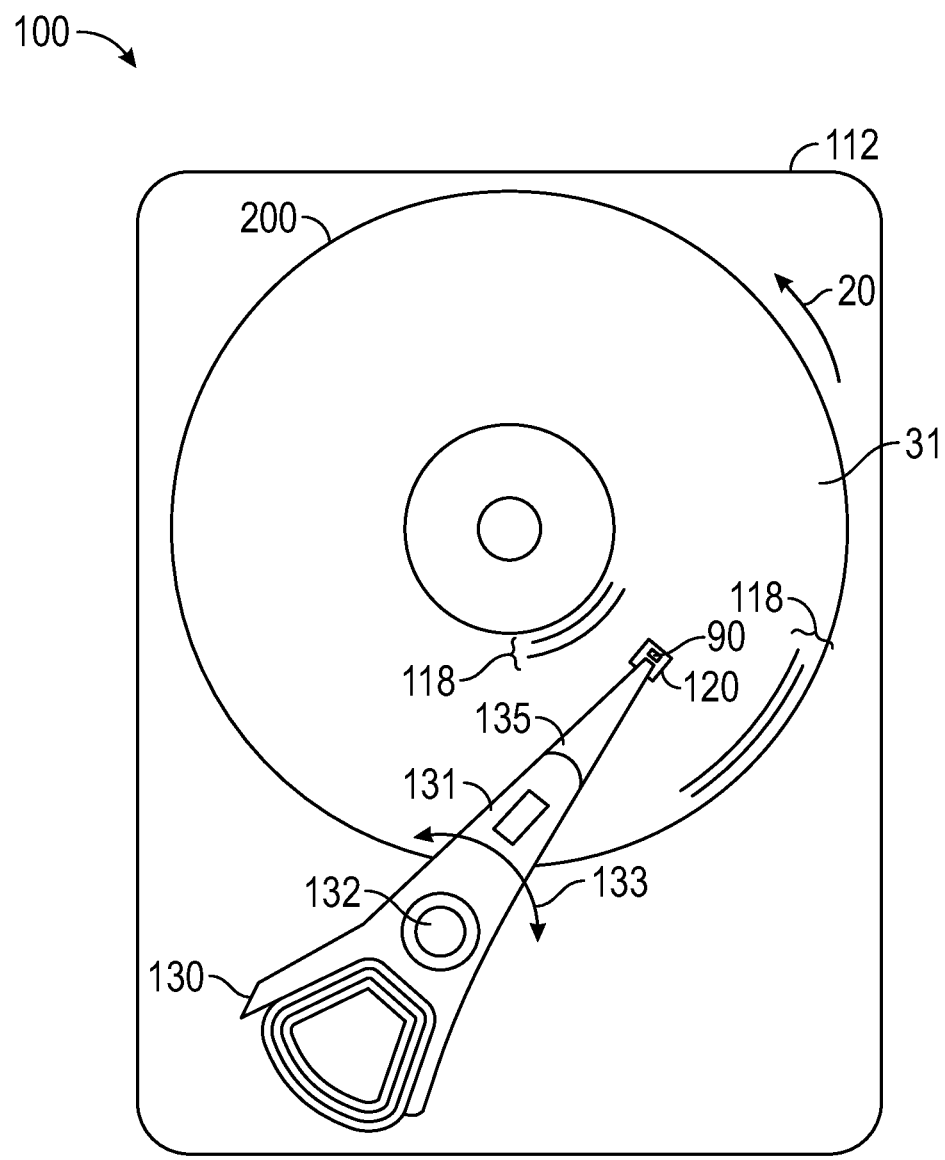
FIG. 1 is a top view of a heat-assisted magnetic recording (HAMR) disk drive according to the prior art.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer (RL) 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing (typically air or helium) generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
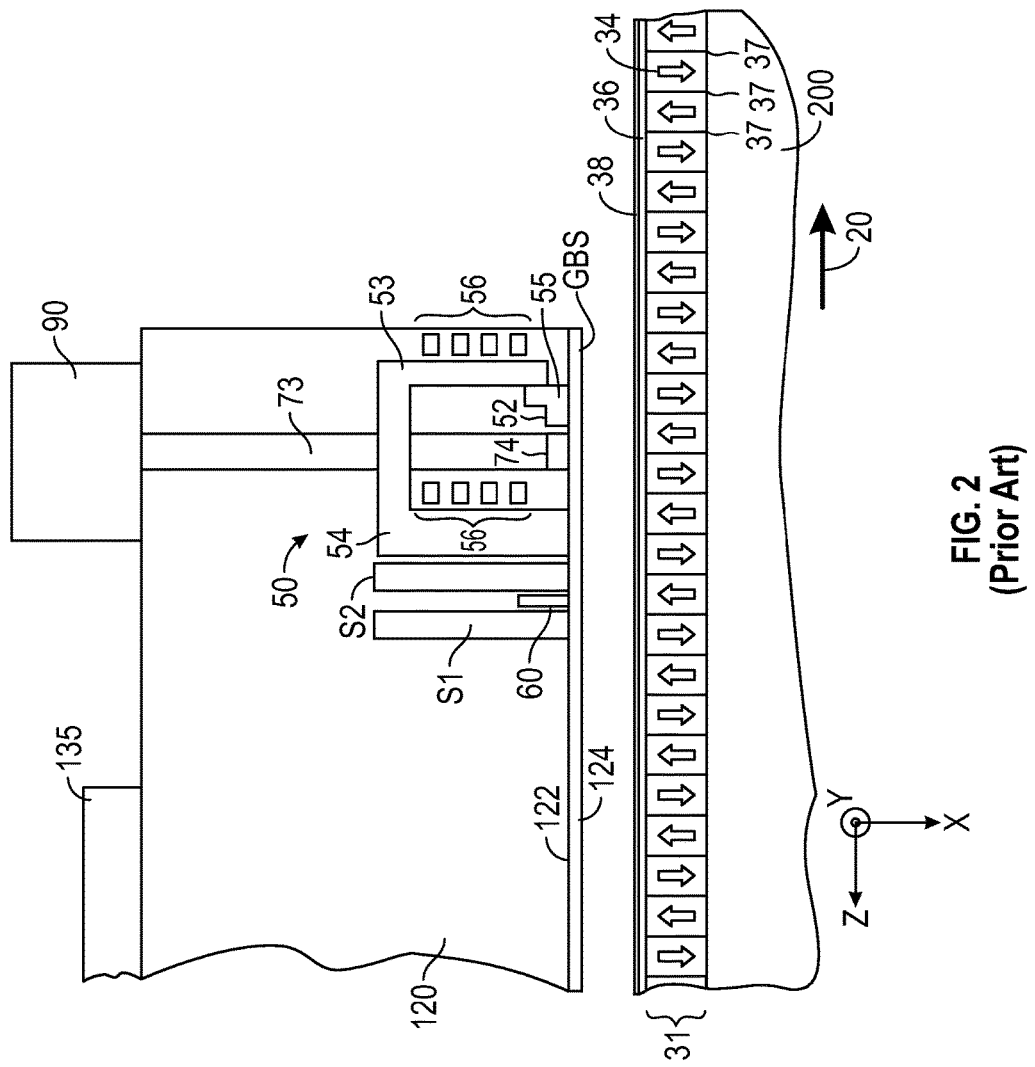
FIG. 2 depicts a sectional view, not drawn to scale because of the difficulty in showing the very small features, of a gas-bearing slider for use in HAMR disk drive and a portion of a HAMR disk according to the prior art.

In the following drawings, the X direction denotes a direction perpendicular to the gas-bearing surface (GB S) of the slider, the Y direction denotes a track width or cross-track direction, and the Z direction denotes the along-the-track direction. FIG. 2 is a schematic cross-sectional view illustrating a configuration example of a HAMR head according to the prior art, which is also capable of functioning as the HAMR head in embodiments of this invention. In FIG. 2, the disk 200 is depicted as a conventional disk with the HAMR RL 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The RL 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The gas-bearing slider 120 is supported by suspension 135. The slider 120 has a recording-layer-facing surface 122 onto which an overcoat 124 is deposited. The overcoat 124 is typically a DLC overcoat with a thickness in the range of about 10 to 30 Å and whose outer surface forms the GBS of the slider 120. An optional adhesion film or undercoat (not shown), such as a 1 to 5 Å silicon nitride ($SiN_x$) film, may be deposited on the surface 122 before deposition of the overcoat 124. The slider 120 supports the magnetic write head 50, magnetoresistive (MR) read head 60, and magnetically permeable read head shields S1 and S2. A recording magnetic field is generated by the write head 50 made up of a coil 56, a main magnetic pole 53 for transmitting flux generated by the coil 56, a write pole 55 with end 52, and a return pole 54. A magnetic field generated by the coil 56 is transmitted through the magnetic pole 53 to the write pole end 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way as to concentrate surface charge motion at a tip located at the slider GBS when light from the waveguide 73 is incident. Oscillating tip charge creates an intense near-field pattern, heating the RL 31. Sometimes, the metal structure of the NFT can create resonant charge motion (surface plasmons) to further increase intensity and heating of the recording layer. At the moment of recording, the RL 31 of disk 200 is heated by the optical near-field generated by the NFT 74 and, at the same time, a region or "bit" 34 is magnetized and thus written onto the RL 31 by applying a recording magnetic field generated by the write pole end 52.

A semiconductor laser 90 is mounted to the top surface of slider 120. An optical waveguide 73 for guiding light from laser 90 to the NFT 74 is formed inside the slider 120. The laser 90 may be capable of operating at different power levels. Materials that ensure a refractive index of the waveguide 73 core material to be greater than a refractive index of the cladding material may be used for the waveguide 73. The waveguide 73 that delivers light to NFT 74 is preferably a single-mode waveguide.

Figure 3:
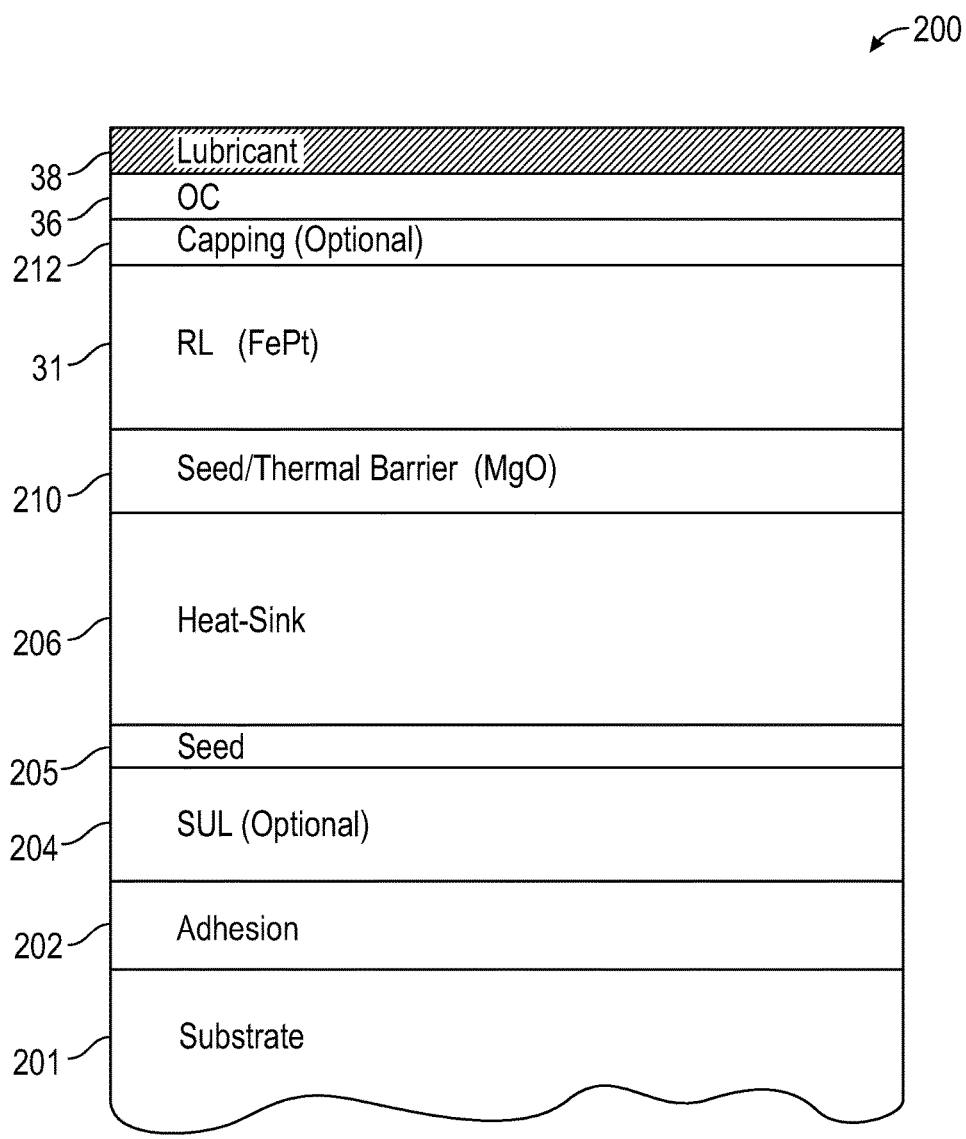
FIG. 3 is a sectional view showing a HAMR disk with a heat-sink layer according to the prior art.

FIG. 3 is a sectional view showing HAMR disk 200 with a continuous granular recording layer (RL) 31 according to the prior art. The RL 31 may be comprised of a substantially chemically-ordered FePt alloy (or CoPt alloy) as proposed in the prior art. The disk 200 is a substrate 201 having a generally planar surface on which the representative layers are sequentially deposited, typically by sputtering. The hard disk substrate 201 may be any commercially available high-temperature glass substrate, but may also be an alternative substrate, such as silicon or silicon-carbide. An adhesion layer 202, typically about 10-200 nm of an amorphous adhesion layer material like a CrTa or NiTa alloy, is deposited on substrate 201.

An optional soft underlayer (SUL) 204 of magnetically permeable material that serves as a flux return path for the magnetic flux from the write head may be formed on the adhesion layer 202. The SUL 204 may be formed of magnetically permeable materials that are also compatible with the high-temperature deposition process for FePt, such as certain alloys of CoFeZr and CoZr. The SUL 204 may also be a laminated or multilayered SUL formed of multiple soft magnetic films separated by nonmagnetic films, such as electrically conductive films of Al or CoCr. The SUL 204 may also be a laminated or multilayered SUL formed of multiple soft magnetic films separated by interlayer films that mediate an antiferromagnetic coupling, such as Ru, Ir, or Cr or alloys thereof. The SUL 204 may have a thickness in the range of about 5 to 100 nm.

A seed layer 205, for example a layer of RuAl or NiAl, is deposited on SUL 204, or on adhesion layer 202 if no SUL is used. A heat-sink layer 206 is deposited on seed layer 205. The heat-sink layer 206 is intended to facilitate the transfer of heat away from the RL 31 to prevent spreading of heat to regions of the RL adjacent to where data is to be written. The heat sink layer 206 may be formed of a material with high thermal conductivity, like Cu, Au, Ag, Ru, Cr, Mo or W or other suitable metals or metal alloys, with a typical thickness between about 5-200 nm.

A layer 210 of MgO is formed on the heat-sink layer 206 and acts as both the seed layer for the RL 31 and a thermal barrier layer. Other materials for the seed/thermal barrier layer 210 include MgO—TiO (MTO), Cr, and RuAl alloy.

The perpendicular media that forms the RL 31 is a high-anisotropy ($K_u$) substantially chemically-ordered FePt alloy (or CoPt alloy) with perpendicular magnetic anisotropy. Substantially chemically-ordered means that the FePt alloy has a composition of the form $Fe_{(y)}Pt_{(100-y)}$ where y is between about 45 and 55 atomic percent. Such alloys of FePt (and CoPt) ordered in $L1_0$ are known for their high magnetocrystalline anisotropy and magnetization, properties that are desirable for high-density magnetic recording materials. The substantially chemically-ordered FePt alloy, in its bulk form, is known as a face-centered tetragonal (FCT) $L1_0$-ordered phase material (also called a CuAu-type crystalline phase). The c-axis of the $L1_0$ phase is the easy axis of magnetization and is oriented perpendicular to the disk substrate. The substantially chemically-ordered FePt alloy may also be a pseudo-binary alloy based on the FePt $L1_0$ phase, e.g., $(Fe_{(y)}Pt_{(100-y)})$—X, where y is between about 45 and 55 atomic percent and the element X may be one or more of Ni, Au, Cu, Pd, Mn and Ag and present in the range of between about 0% to about 20% atomic percent. While the pseudo-binary alloy in general has similarly high anisotropy as the binary alloy FePt, it allows additional control over the magnetic and other properties of the RL. For example, Ag improves the formation of the $L1_0$ phase and Cu reduces the Curie temperature.

FePt $L1_0$ phase based granular thin films exhibit strong perpendicular anisotropy, which potentially leads to small thermally stable grains for ultrahigh density magnetic recording. To fabricate small grain FePt $L1_0$ media some form of segregant to separate grains can be used as an integral part of the magnetic recording layer. Thus the RL 31 also typically includes a segregant, such as one or more of C, $SiO_2$, $TiO_2$, $TaO_x$, $ZrO_2$, SiC, SiN, TiC, TiN, B, BC, and BN that forms between the FePt grains and reduces the grain size. While FIG. 3 depicts the RL 31 as a single magnetic layer, the recording layer may be a multilayer, for example multiple stacked FePt sublayers, each with a different segregant, as described in U.S. Pat. No. 9,406,329 B1 which is assigned to the same assignee as this application.

The FePt RL is sputter deposited, typically to a thickness of between about 4 to 15 nm, while the disk substrate 201 is maintained at an elevated temperature, for example between about 300 and 700° C. The FePt RL may be sputter deposited from a single composite target having generally equal atomic amounts of Fe and Pt and with the desired amounts of X-additives and segregant, or co-sputtered from separate targets.

An optional capping layer 212, such as a thin film of Co, may be formed on the RL 31. A protective overcoat (OC) 36 is deposited on the RL 31 (or on the optional capping layer 212), typically to a thickness between about 1-5 nm. OC 36 is preferably a layer of amorphous diamond-like carbon (DLC). The DLC may also be hydrogenated and/or nitrogenated, as is well-known in the art. On the completed disk, a liquid lubricant 38, like a perfluorpolyether (PFPE), is coated on OC 36.

A problem associated with a HAMR disk is optimization of the heat profile in the RL 31. Heat is generated in the recording layer by localized absorption of light into the recording layer. Intense electromagnetic fields (the light) are generated in the recording layer by laser excitation of the near-field transducer. Proper optical coupling between the NFT 74 and the RL 31 will result in a confined and sharp absorption profile in the recording layer. The temperature profile in the recording layer results from the absorption profile and the thermal transport properties of the HAMR disk, specifically those of the RL 31, the seed/thermal barrier layer 210 and the heat-sink layer 206.

If the thermal conductivities of the seed/thermal barrier layer 210 and heat-sink layer 206 are not optimized, the heat absorbed in the RL 31 under the NFT 74 will mostly spread laterally through RL 31. This is undesirable because the temperature rise needs to be locally confined to the bit region being recorded, which means there should be a large lateral thermal gradient, i.e., a rapid drop in temperature around the Curie temperature ($T_c$). A large along-the-track thermal gradient allows data to be written at high linear density. A large cross-track thermal gradient allows the data tracks to be positioned very close together. Thus writing data on one track will not alter the data already written on neighboring tracks.

Figure 4:
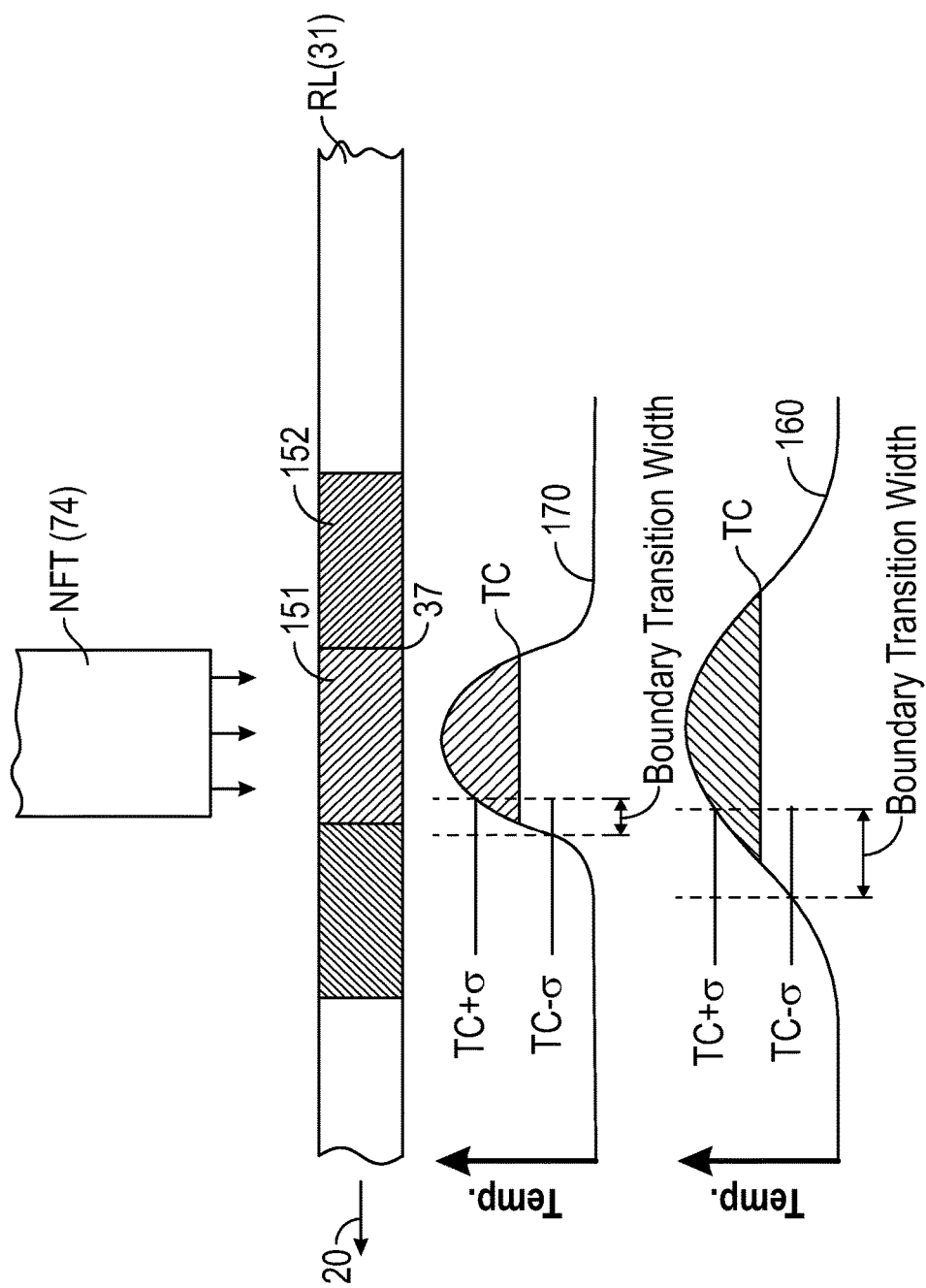
FIG. 4 is an illustration of a near-field transducer (NFT) directing light to a region of a recording layer that by absorption results in the heating of the recording layer, with graphs showing different temperature profiles.

Large thermal gradients are important for HAMR recording to achieve narrow bit transitions 37 in between two magnetic bits 34, in spite of the property distributions of the recording layer. For instance, the grains of the recording layer material will have different values of $T_c$. If there is large temperature spreading (low thermal gradient) some grains with low $T_c$, e.g., ($T_c$–σ), to the left of the desired bit transition location will be written, and some grains with high $T_c$, e.g., $(T_c+\sigma)$, to the right of the desired bit transition location will not be written. Because of $T_c$ distributions in the recording layer, the boundaries of a recorded bit are imperfectly written or noisy. In other words, the bit transitions have an increased width. The extent of these noisy boundaries, or the width of the bit transitions, depends on the $T_c$ distribution and the thermal gradient. With a larger thermal gradient, the boundary transition width is smaller. This is depicted in the schematic of FIG. 4. FIG. 4 illustrates the NFT 74 directing light to a region 151 of RL 31. The trailing edge of region 151 is where the desired bit transition 37 is to be recorded. The RL 31 moves in the direction of arrow 20 past NFT 74. The light is converted to heat by absorption in the recording layer RL 31. Curve 160 is a temperature profile of RL 31 with a low thermal gradient. The shaded area of curve 160 is the area where the temperature is above the average Curie temperature ($T_c$) of the RL material. Curve 160 represents a temperature profile with a low thermal gradient, meaning that the drop of temperature around $T_c$ is too slow or gradual. The bit transition, or region where grains are only partially written/erased, corresponds to locations where the temperature T is between $(T_c-\sigma)$ and $(T_c+\sigma)$. With a low thermal gradient, the bit transitions are too large to record at high linear density with sufficient signal-to-noise ratio. Curve 170 is a temperature profile of RL 31 with a high thermal gradient. The region where the temperature T is between $(T_c-\sigma)$ and $(T_c+\sigma)$ is smaller, resulting in sharper bit transitions. Consequently, with a larger down-track thermal gradient, the bits can be made smaller allowing recording at high linear density. Concurrently, with a larger cross-track thermal gradient, the data tracks can be positioned closer together allowing recording at higher track density. To achieve a high thermal gradient, heat-sink layers, like layer 206 in FIG. 3, have been used in an attempt to optimize the dissipation of heat from the RL 31. The conventional heat-sink materials have isotropic thermal conductivity, meaning that the thermal conductivity in-plane is substantially the same as the thermal conductivity out-of-plane.

Figure 5:
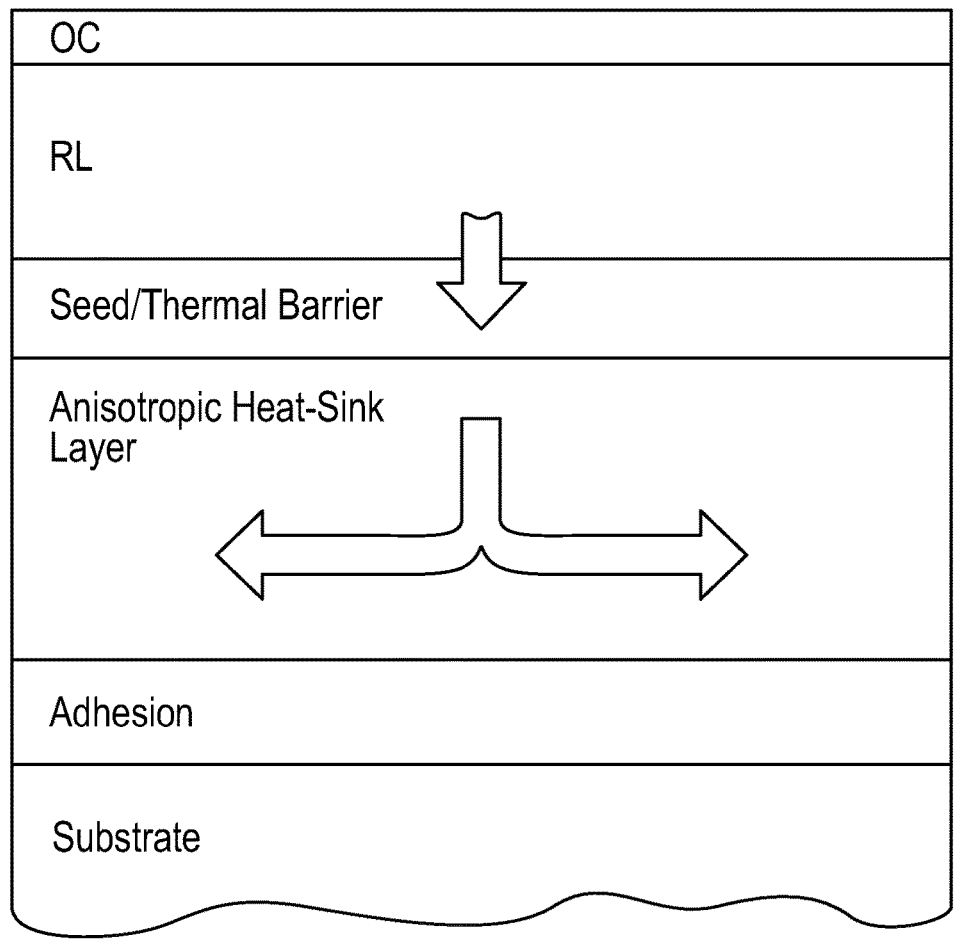
FIG. 5 is a sectional view showing a HAMR disk with an anisotropic heat-sink layer illustrating the lateral in-plane transfer of heat according to an embodiment of the invention.

In embodiments of this invention it has been discovered that high thermal gradients can be achieved with heat-sink materials that have anisotropic thermal conductivity, meaning that the thermal conductivity in-plane is higher than the thermal conductivity out-of-plane. This is represented schematically in FIG. 5, where the arrow represents the lateral or in-plane dissipation of heat in the anisotropic heat-sink layer.

Figure 6:
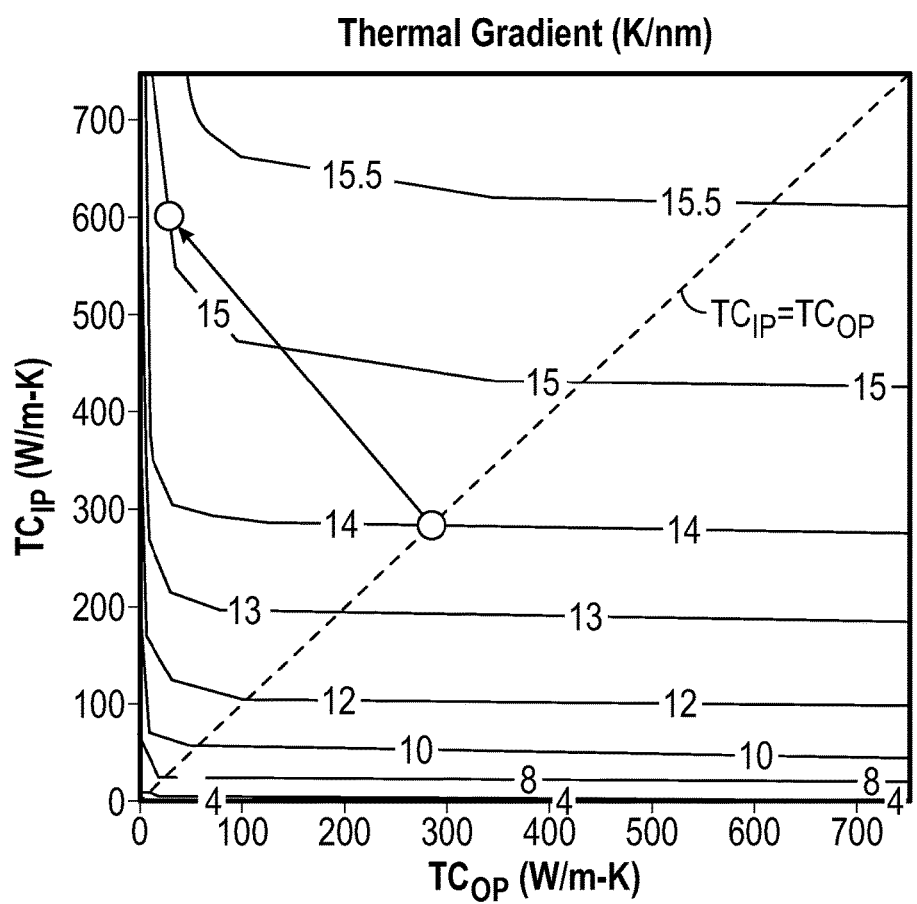
FIG. 6 is an illustration of a family of thermal gradient curves in Kelvin/nm (K/nm) as a function of in-plane thermal conductivity ($TC_{IP}$) (vertical axis) and out-of-plane thermal conductivity ($TC_{OP}$) (horizontal axis).

The results of computer thermal modeling have shown the improvement in thermal gradient for a HAMR media with an anisotropic heat-sink layer. The modeling was done for a system with a NFT positioned 5 nm above the surface of a HAMR disk. The HAMR disk comprised a 5 nm DLC overcoat, a 10 nm composite FePt recording layer, a 5 nm MgO seed/thermal barrier and a 60 nm heat-sink layer whose in-plane and out-of-plane thermal conductivities were systematically varied. The results are shown in FIG. 6, which is a family of thermal gradient curves in Kelvin/nm (K/nm) as a function of in-plane thermal conductivity ($TC_{IP}$) (vertical axis) and out-of-plane thermal conductivity ($TC_{OP}$) (horizontal axis). The diagonal dashed line represents examples where $TC_{IP}=TC_{OP}$. As one example represented by the arrow in FIG. 6, the thermal gradient increases from about 14 K/nm for $TC_{IP}=TC_{OP}=300$ W/mK ($TC_{IP}/TC_{OP}=1.0$) to about 15 K/nm for $TC_{IP}=600$ W/mK and $TC_{OP}=30$ W/mK ($TC_{IP}/TC_{OP}=20.0$).

Figure 7:
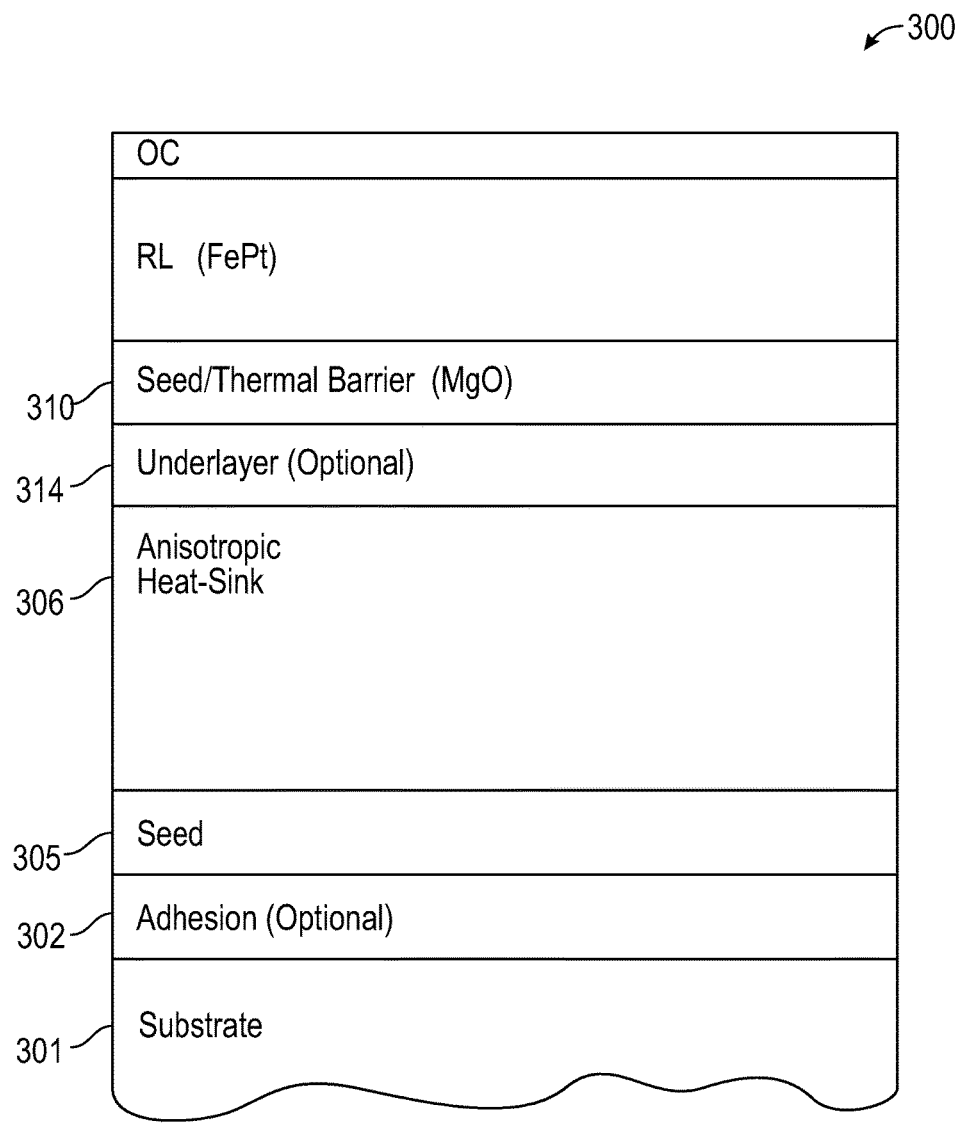
FIG. 7 is a sectional view showing a HAMR disk with an anisotropic heat-sink layer according to an embodiment of the invention.

FIG. 7 is a sectional view showing a HAMR disk 300 with an anisotropic heat-sink layer 306 according to an embodiment of the invention. The disk substrate 301, seed/thermal barrier layer 310, RL and OC may be as described for the prior art HAMR 200 disk in FIG. 3. In this embodiment the optional SUL, optional capping layer, and lubricant are not depicted. The preferred material for anisotropic heat-sink layer 306 may be selected from hexagonal boron nitride (h-BN), hexagonal graphite and the 6H polytype of hexagonal silicon carbide (6H-SiC). The heat-sink layer 306 may have a thickness in the range of about 10 to 100 nm.

Figure 8:
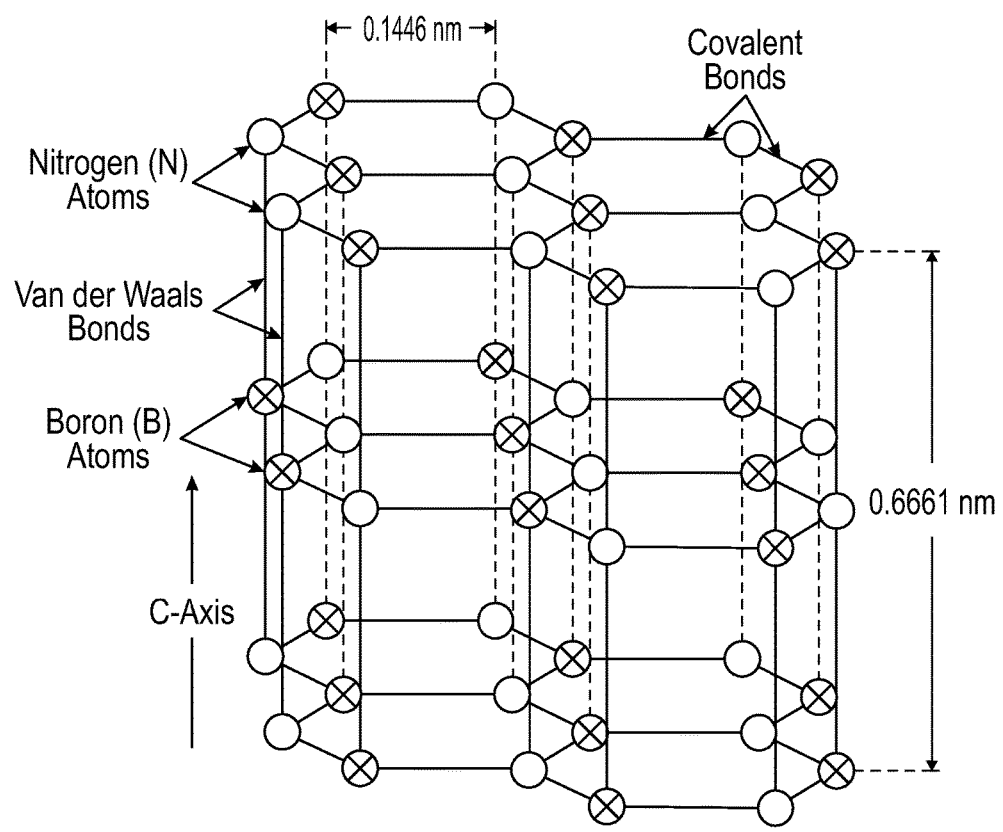
FIG. 8 is an illustration of the crystalline structure of hexagonal boron nitride (h-BN).

Hexagonal boron nitride (h-BN) has a two-dimensional (2D) layered structure similar to hexagonal graphite. Within each layer, boron and nitrogen atoms are bound by strong covalent bonds, whereas the layers are held together by weak van der Waals forces. The crystalline structure of h-BN is depicted in FIG. 8, which shows the c-axis oriented substantially orthogonal to the 2D BN layers. Due to their strong covalent bond between B—N and C—C atoms, h-BN and hexagonal graphite hold similar structural and physical properties such as strong mechanical properties, high thermal stability and high thermal conductivity. The in-plane (orthogonal to the c-axis) thermal conductivity ($TC_{IP}$) of h-BN has been reported to be as high as 600 W/mK (Sichel et al., PHYSICAL REVIEW B, VOL 13, NUMBER 10, 15 May 1976) and measured to be between 480-620 W/mK for a bilayer h-BN structure (Wang et al., Scientific Reports|6: 25334|DOI: 10.1038/srep25334, www.nature.com/scientificreports). The out-of-plane (substantially parallel to the c-axis) thermal conductivity ($TC_{OP}$) of h-BN is lower than 30 W/mK. The $TC_{IP}/TC_{OP}$ ratio for h-BN is preferably greater than about 1.2 and may be as high as 20.0.

A seed layer 305 (FIG. 7) is required to grow h-BN with the c-axis oriented out of plane. Suitable seed layer materials include hexagonal materials such as Ru, Ti, Co, Re, Zr and Zn, with the [002] crystallographic direction oriented out-of-plane, and face-centered cubic (fcc) materials such as Au, Ag, Sr, Ni, Pt, Pd, Cu, Ir, Rh, with the [111] crystallographic direction oriented out-of-plane. The seed layer 305 may be deposited to a thickness between about 5 and 50 nm. An optional adhesion layer 302 may be formed on substrate 301 to facilitate the growth of seed layer 305. Suitable adhesion layer materials include amorphous materials such as CrTa, CrTi, and NiTa alloys, and combinations thereof. The adhesion layer 302 may be deposited to a thickness between about 40 and 100 nm.

The h-BN anisotropic heat-sink layer 306 may be deposited by radio-frequency (RF) sputtering at high temperatures (>600° C.) and sputter pressures between 1.5 mtorr and 15 mtorr in an Ar—$N_2$ sputter gas environment. The Ar/$N_2$ gas ratio can vary from 100% Ar to 100% $N_2$. High-power impulse magnetron sputtering (HIPIMS) may also be used to form the h-BN layer, with temperatures up to 1000° C. and pressures ranging from several mtorr to several torr. Chemical vapor deposition (CVD) techniques such as Metal-Organic CVD (MO-CVD) or Plasma-Enhanced CVD (PE-CVD) may also be used. The process for forming the h-BN should result in h-BN films with grain size larger than about 100 nm to assure high thermal conductivity since it is known that thermal conductivity for bulk BN increases with grain size.

If h-BN is the anisotropic heat-sink material for layer 306, then an optional amorphous underlayer 314 (FIG. 7) may be used to facilitate the growth of typical MgO seed/thermal barrier layer 310. Underlayer 314 may be formed of amorphous materials such as alloys comprising Co and W, like CoZrWMo, CoNiWCr, or CoTaWMo alloys, to a thickness in the range of about 5 to 20 nm.

Hexagonal graphite has a layered, planar structure. The individual layers are called graphene. Graphene is a 2D layered material with a crystalline structure identical to h-BN. In each graphite layer, the carbon atoms are arranged in a honeycomb lattice with separation of 0.142 nm, and the distance between planes is 0.335 nm. Hexagonal graphite is the 3D version of graphene, corresponding to multiple planes of hexagonal carbon chains with the same basal plane structure as graphene. Pyrolitic graphite is hexagonal graphite with a high degree of preferred crystallographic orientation of the c-axes, substantially perpendicular to the surface of the substrate, and can be obtained by chemical vapor deposition (CVD) at temperatures above 1830° C.

Hexagonal graphite may function as a suitable anisotropic heat-sink layer. Hexagonal graphite has $TC_{IP}$ values of up to 2000 W/mK. Lower values have been reported, depending on film quality. The $TC_{IP}$ range for hexagonal graphite is between about 100 to 2000 W/mK, with ratios of $TC_{IP}/TC_{OP}$ reported of 50 to 500. (Slack, *PHYSICAL REVIEW*, VOL 127, NUMBER 3, Aug. 1, 1962). Hexagonal graphite may be deposited by CVD, plasma-enhanced CVD and pulse-laser deposition techniques.

The 6H polytype of hexagonal silicon carbide (6H-SiC) may function as a suitable anisotropic heat-sink layer. This material has a $TC_{IP}$ of about 387 W/mK and a $TC_{OP}$ of about 270 W/mK at room temperature for a $TC_{IP}/TC_{OP}$ ratio of about 1.43. (Burgemeister, *Journal of Applied Physics* 50, 5790 (1979); doi: 10.1063/1.326720). 6H-SiC may be deposited by RF sputter deposition and CVD techniques.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording medium comprising:
    a substrate;
    a heat-sink layer on the substrate, the heat-sink layer selected from the group consisting of hexagonal boron nitride (h-BN), hexagonal graphite, and the 6H polytype of hexagonal silicon carbide (6H-SiC) and having anisotropic thermal conductivity, the thermal conductivity in the plane of the heat-sink layer being greater than the thermal conductivity normal to the plane of the heat-sink layer;
    a magnetic recording layer; and
    a seed/thermal barrier layer for the recording layer on the heat-sink layer, wherein the recording layer is on and in contact with the seed/thermal barrier layer.

2. The medium of claim 1 wherein the ratio of thermal conductivity in the plane of the heat-sink layer to the thermal conductivity normal to the plane of the heat-sink layer is greater than 1.2.

3. The medium of claim 2 wherein the thermal conductivity in the plane of the heat-sink layer is greater than 50 W/mK.

4. The medium of claim 1 wherein the heat-sink layer comprises hexagonal boron nitride (h-BN) having its c-axis oriented substantially normal to the plane of the heat-sink layer, and further comprising a seed layer between the substrate and the heat-sink layer, wherein the heat-sink layer is on and in contact with the seed layer.

5. The medium of claim 4 wherein the seed layer for the heat-sink layer comprises a material having hexagonal crystalline structure with its [002] crystallographic direction oriented out-of-plane.

6. The medium of claim 5 wherein the seed layer for the heat-sink layer comprises a material selected from the group consisting of Ru, Ti, Co, Re, Zr and Zn.

7. The medium of claim 5 further comprising an amorphous adhesion layer between the substrate and the seed layer for the heat-sink layer, wherein the seed layer for the heat-sink layer is on and in contact with the adhesion layer.

8. The medium of claim 7 wherein the adhesion layer comprises an alloy comprising two or more elements selected from the group consisting of Cr, Ta and Ti.

9. The medium of claim 4 wherein the seed layer for the heat-sink layer comprises a material having a face-centered-cubic crystalline structure with its [111] crystallographic direction oriented out-of-plane.

10. The medium of claim 9 wherein the seed layer for the heat-sink layer comprises a material selected from the group consisting of Au, Ag, Sr, Ni, Pt, Pd, Cu, Ir and Rh.

11. The medium of claim 1 further comprising an amorphous underlayer between the heat-sink layer and the seed/thermal barrier layer, wherein the seed/thermal barrier layer is on and in contact with the underlayer.

12. The medium of claim 1 wherein the magnetic recording layer comprises a chemically-ordered alloy selected from a FePt alloy and a CoPt alloy, and wherein the seed/thermal barrier layer for the recording layer comprises MgO.

13. A heat assisted magnetic recording (HAMR) disk drive comprising:
    the medium according to claim 1 wherein said medium is a rotatable HAMR disk; and
    a carrier maintained near the magnetic recording layer of said medium and supporting a HAMR head, the HAMR head comprising a near-field transducer.

14. A heat-assisted magnetic recording (HAMR) disk comprising:
    a disk substrate having a substantially planar surface;
    a heat-sink layer on the substrate, the heat-sink layer comprising hexagonal boron-nitride (h-BN) having its c-axis oriented substantially orthogonal to the substrate surface;
    a seed layer for the heat-sink layer between the substrate and the heat-sink layer, wherein the heat-sink layer is on and in contact with the seed layer;
    a seed/thermal barrier layer comprising MgO on the heat-sink layer; and
    a perpendicular magnetic recording layer comprising a chemically-ordered alloy selected from a FePt alloy and a CoPt alloy on and in contact with the seed/thermal barrier layer.

15. The disk of claim 14 wherein the heat-sink layer comprising h-BN has anisotropic thermal conductivity, the ratio of thermal conductivity substantially orthogonal to the c-axis to thermal conductivity substantially parallel to the c-axis being greater than 1.2.

16. The disk of claim 15 wherein the thermal conductivity in the plane of the heat-sink layer is greater than 50 W/mK.

17. The disk of claim 14 wherein the seed layer for the heat-sink layer comprises a material having hexagonal crystalline structure with its [002] crystallographic direction oriented out-of-plane.

18. The disk of claim 14 wherein the seed layer for the heat-sink layer comprises a material having a face-centeredcubic crystalline structure with its [111] crystallographic direction oriented out-of-plane.

19. The disk of claim 14 further comprising an amorphous adhesion layer on and in contact with the substrate surface, wherein the seed layer for the heat-sink layer is on and in contact with the adhesion layer.

20. The disk of claim 14 further comprising an amorphous underlayer between the heat-sink layer and the seed/thermal barrier layer, wherein the seed/thermal barrier layer is on and in contact with the underlayer.

21. A heat assisted magnetic recording (HAMR) disk drive comprising:
   the disk according to claim 14; and
   a gas-bearing slider maintained near the magnetic recording layer of said disk and supporting a HAMR head, the HAMR head comprising a near-field transducer.

22. A heat-assisted magnetic recording medium comprising:
   a substrate;
   a heat-sink layer on the substrate, the heat-sink layer having anisotropic thermal conductivity, the thermal conductivity in the plane of the heat-sink layer being greater than the thermal conductivity normal to the plane of the heat-sink layer;
   a magnetic recording layer;
   a seed/thermal barrier layer for the recording layer on the heat-sink layer, wherein the recording layer is on and in contact with the seed/thermal barrier layer; and
   an amorphous underlayer between the heat-sink layer and the seed/thermal barrier layer, wherein the seed/thermal barrier layer is on and in contact with the underlayer.

* * * * *